K. LEON.
FISHHOOK.
APPLICATION FILED JAN. 19, 1920.

1,340,780.

Patented May 18, 1920.

Kalman Leon
INVENTOR

BY Victor J. Evans
ATTORNEY

UNITED STATES PATENT OFFICE.

KALMAN LEON, OF WASHINGTON, DISTRICT OF COLUMBIA.

FISHHOOK.

1,340,780.  Specification of Letters Patent.  Patented May 18, 1920.

Application filed January 19, 1920. Serial No. 352,279.

*To all whom it may concern:*

Be it known that I, KALMAN LEON, a citizen of the United States, residing at Washington, in the District of Columbia, have invented new and useful Improvements in Fishhooks, of which the following is a specification.

The object of my present invention is the provision of a simple, strong and durable fish-hook that is calculated to preclude the escape of a fish after it takes the bait.

To the attainment of the foregoing, the invention consists in the improvement as hereinafter described and definitely claimed.

In the accompanying drawings, hereby made a part hereof:

Similar numerals of reference designate corresponding parts in all of the views of the drawings.

Figure 1:
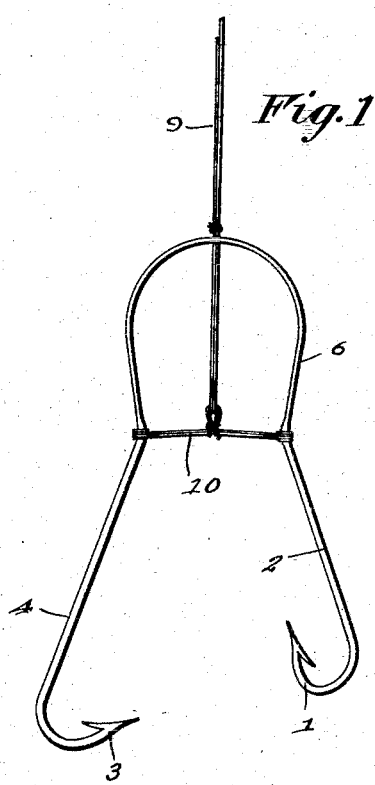
Figure 1 is a side elevation showing my novel fish-hook in normal state.

Among other elements my novel fish-hook comprises a bait hook 1 having a shank 2, and a gaffing hook 3 having a shank 4; the hook 3 and its shank 4 being arranged as illustrated, relatively to the hook 1.

The heel ends of the hook shanks 2 and 4 are integral with or are suitably joined at 5 to the ends of a spring bail 6, reduced portions 7 being provided at the points of junction for a purpose hereinafter set forth. The said spring bail 6 is provided at 8 with an aperture for the passage of a leader 9 which may be of cat-gut or other appropriate material. At its lower end the leader 9 is connected to an interposed connection 10 of cat-gut or other appropriate material, which connection 10 extends between the reduced portions 7 of the joined hooks and bail. Manifestly the interposition of the connection 10 between the reduced portions 7 will preclude slipping of the said connection 10.

Figure 2:
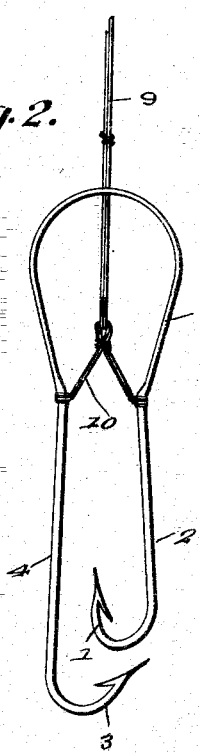
Fig. 2 is a similar view showing the positions the parts assume when a fish has taken the baited hook in its mouth and exerted a pull thereon.
Figure 3:
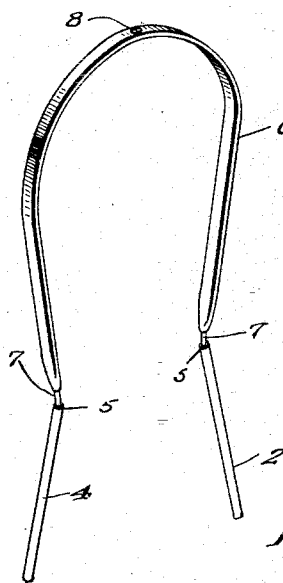
Fig. 3 is a detail perspective, on an enlarged scale, illustrative of the spring bail of the hook.

When in practice a fish takes the hook 1 with the bait thereon, the pull of the fish on the hook 1 and the placing of the leader 9 under tension will cause the parts to assume the positions shown in Fig. 2, with the result that the hook 3 will gaff the fish and preclude the escape of the fish certainly so long as the leader 9 is held under tension.

Having described my invention, what I claim and desire to secure by Letters-Patent, is:

1. A fish-hook comprising a bait hook having a shank, a gaffing hook having a comparatively long shank, a spring bail having a central aperture, reduced portions between the ends of said bail and the heel ends of the hook shanks, a flexible connection between said reduced portions, and a leader connected to said flexible connection and movable through the aperture in the bail.

2. A fish-hook comprising a bait hook and a fish-securing hook, a spring bail joining and forming a continuation of the the heel ends of the hooks, and a line connection between the joined portions of the hooks and bail.

3. A fish-hook comprising a bait-hook, a fish-securing hook, and resilient means joining and forming a continuation of the heel portions of the hooks to normally maintain the hooks in widely separated relation; said resilient means being adapted to be pressed by the pull of a fish on the bait hook and the consequent placing of the line to which the hook is connected under tension.

In testimony whereof I affix my signature.

KALMAN LEON.